United States Patent [19]

Kawarai et al.

[11] Patent Number: 5,278,701
[45] Date of Patent: Jan. 11, 1994

[54] VIDEO CAMERA COMBINED WITH A VCR HAVING A CYLINDER ASSEMBLY POSITIONED IN A DIRECTION LONGITUDINALLY OUTWARD OF A REEL HUB WITH RESPECT TO THE OTHER REEL HUB THEREOF OF A TAPE CASSETTE LOADED THEREIN

[75] Inventors: Takeshi Kawarai, Higashiibaragi; Seiko Nakasuna, Katsuta; Takanori Nishiyama, Koganei, all of Japan

[73] Assignee: Hitachi, Ltd., Tokyo, Japan

[21] Appl. No.: 728,159

[22] Filed: Jul. 10, 1991

[30] Foreign Application Priority Data

Jul. 13, 1990 [JP] Japan ................ 2-183884
Jul. 13, 1990 [JP] Japan ................ 2-183885

[51] Int. Cl.⁵ ............................................ H04N 5/78
[52] U.S. Cl. .................................. 360/33.1; 358/906
[58] Field of Search .............. 360/33.1, 137, 85, 95; 358/906, 909, 209, 310, 328, 312; 369/76

[56] References Cited

U.S. PATENT DOCUMENTS 4,583,136  4/1986  Tsuchida et al. ............ 360/85
4,885,643  12/1989  Ichimura et al. ............ 358/906
5,162,915  11/1992  Idera et al. ................. 358/906

FOREIGN PATENT DOCUMENTS 1-106585  10/1989  Japan .

*Primary Examiner*—Edward P. Westin
*Assistant Examiner*—Que T. Le
*Attorney, Agent, or Firm*—Fay, Sharpe, Beall, Fagan, Minnich & McKee

[57] ABSTRACT

A video camera combined with VCR comprises a camera unit for imaging an object and producing a video signal representing an image of the object, and a video signal recording unit including a supply reel base, a take-up reel base, and a cylinder assembly made up of a fixed cylinder and a rotatable cylinder having a magnetic head built therein for recording the video signal on magnetic tape. The cylinder assembly is positioned in a direction longitudinally outward of a reel hub with respect to the other reel hub of a tape cassette loaded in the video signal recording unit. The camera unit is positioned toward the object in front of the video signal recording unit.

10 Claims, 9 Drawing Sheets

VIDEO CAMERA COMBINED WITH A VCR HAVING A CYLINDER ASSEMBLY POSITIONED IN A DIRECTION LONGITUDINALLY OUTWARD OF A REEL HUB WITH RESPECT TO THE OTHER REEL HUB THEREOF OF A TAPE CASSETTE LOADED THEREIN

BACKGROUND OF THE INVENTION

The present invention relates to a video camera combined with a VCR (Video Cassette Recorder). More particularly, it relates to a video camera combined with a VCR which has excellent operationablity and stability in imaging.

Dimensions of the video camera combined with a VCR are important factors to determine its shape as will be described by referring to FIGS. 7 and 8.

FIG. 7 is a plan view for the video camera combined with a VCR with an operator using it. FIG. 8 is a side view of the video camera combined with VCR and the operator of FIG. 7 as seen from arrow X. Dimension A in FIG. 7 is a horizontal projection distance of a viewfinder 5 for an eye of the operator. The best distance A is usually 40 to 110 mm. Dimension C is a distance from a shoulder of the operator to the viewfinder 5. Its usual best distance C is around 145 mm. Dimension D is a distance from a center of the shoulder of the operator to a grip. The desirable distance D is not shorter than 250 mm. Dimension B is a height of a main body of the video camera combined with VCR 1. The preferable dimension B is as small as possible. These data were obtained on the basis of human engineering by measuring sizes of human bodies and using various mock-ups of the video camera combined with a VCR.

Best sizes of the video camera combined with a VCR can be summarized as follows. It should ideally be made deeper and as short a height as possible and have the viewfinder in the best position. The dimensions should meet the following conditions.

$$D \approx 2C \quad (1)$$

$$B < C \quad (2)$$

For consideration of conventional video cameras combined with a VCR, refer to FIG. 9 which is a side view of a model of the conventional video cameras combined with a VCR. Its main body has a camera unit 2 and a VCR unit 3 combined. The camera unit 2 has a grip 6 provided on a side thereof. The VCR unit 3 has a demountable battery 4 provided on a rear side thereof. The VCR unit 3 also has a handle 21, a viewfinder 5, and a microphone 7 provide on a top thereof. The viewfinder 5 and the microphone 7 are integrated together. Dimensions of the conventional video camera combined with VCR are given as follows.

$$D \approx 1.5C \quad (3)$$

$$B < C \quad (4)$$

The conventional apparatus does not have a desirable shape. The following describes some causes of such a failure by referring to FIG. 10.

FIG. 10 is a sectional side view illustrating the inside of the a VCR unit 3 of the video camera combined with VCR shown in FIG. 9, more particularly illustrating a magnetic tape traveling mechanism of the VCR unit 3. A reel hub for a tape cassette 8 is mounted on a supply reel base 9 and a take-up reel base 10. A magnetic tape 12 is pulled out from a supply reel base 9 through a rotatable roller 13, passes a full-width erasing head 14, an impedance roller 15, and a guide roller 16, and is wound about 190 degrees on a cylinder assembly 11. It then passes an audio head 18 and is forced to move further by a capstan 20 and a pinch roller 19. It finally is wound on the take-up reel base 10. This mechanism is for the VCR of so-called helical scanning type. The usual VCR has to wind the magnetic tape 12 obliqely on the cylinder assembly 11 to increase recording density in recording and reproduction. It therefore must make a tape loading so that the magnetic tape 12 is wound on the cylinder assembly 11 as pulled out of the tape cassette 8.

In the conventional technique, as shown in FIG. 10, the cylinder assembly 11 is ordinarily positioned to be perpendicular to a longitudinal direction of the tape cassette 8. The mechanism of the VCR therefore must be likely square, or 1:1 in the aspect ratio, as seen from a side view. Consequently, the conventional video camera combined with VCR has to take a shape given in Eqs. (3) and (4). This frequently proves to be a great inconvenience in developing the ideal video camera combined with a VCR.

As described above, the previous video cameras combined with a VCR could not have the idea external shape for mounting on the shoulder of the operator in view of the human engineering. Reduction in size was also limited since the cylinder had to be positioned perpendicular to the tape cassette. As such, efforts have been made toward developing a tape traveling mechanism to minimize the size of the video camera combined with a VCR.

The Japanese Patent Application Laid-Open No. 1-106585 disclosed a video camera combined with a VCR in which a cylinder is positioned in a roughly longitudinal direction of a tape cassette to make it small. The video camera combined with a VCR described in this prior application has a camera unit and a VCR unit arranged together for use with an 8 mm size VCR cassette in a compact style. However, it cannot be stably place on the operator's shoulder in imaging.

SUMMARY OF THE INVENTION

In view of the foregoing, it is a general object of the present invention to provide a video camera combined with a VCR having an external shape that is the suitable for mounting on a shoulder of an operator in imaging and compact in overall structure.

Briefly, the foregoing object is accomplished in accordance with aspects of the present invention by providing a video camera combined with a VCR which comprises a camera unit for imaging an object and producing a video signal representing an image of the object, and a video signal recording unit including a supply reel base, a take-up reel base, and a cylinder assembly made up of a fixed cylinder and a rotatable cylinder having a magnetic head built therein for recording the video signal on magnetic tape, wherein the cylinder assembly is positioned in a longitudinal direction of a tape cassette loaded in the video signal recording unit, or, in other words, in a direction longitudinally outward of one hub reel of the cassette with respect to the other hub reel, and the camera unit is positioned toward the object in front of the video signal recording unit, or between the video signal recording unit and the object during imaging.

The cylinder assembly is positioned in a longitudinal direction of the tape cassette loaded. The video signal recording unit therefore can be shaped rectangle. The camera unit is provided toward an object in the front of the video signal recording unit. These features provide the video camera combined with a VCR a length from the grip to the shoulder sufficient to place it on the shoulder, and also render the height of the video camera combined with a VCR shorter. This shape is ideal in view of human technology when it is put on the shoulder.

DETAILED DESCRIPTION OF EMBODIMENTS

The present invention is illustrated in further detail by reference to the accompanying drawings.

Figure 1:
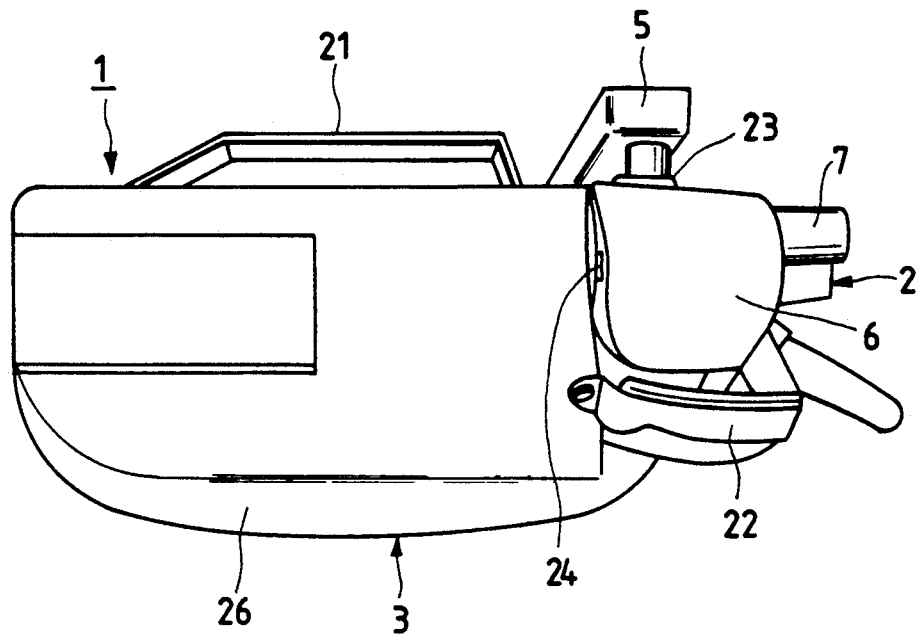
FIG. 1 is an external perspective view of a video camera combined with a VCR according to a first embodiment of the present invention.
Figure 2:
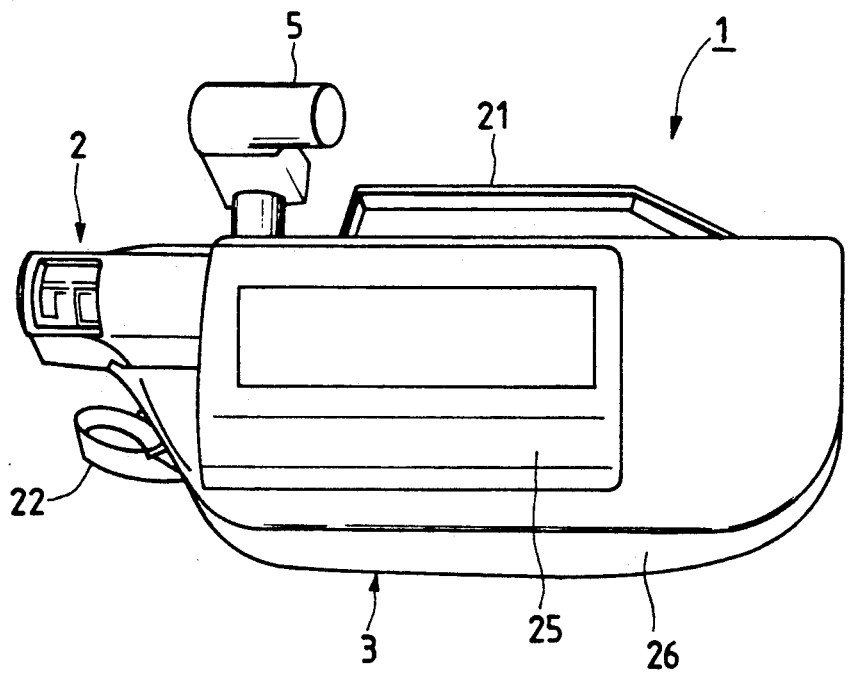
FIG. 2 is another external perspective view for the video camera combined with a VCR of FIG. 1 viewing a rear side thereof.

FIG. 1 is an external perspective view for a first illustrative embodiment of the present invention for a video camera combined with a VCR. FIG. 2 is another external perspective view for the video camera combined with a VCR shown in FIG. 1 viewing a rear side thereof. In FIGS. 1 and 2 is shown a video camera combined with a VCR 1 for use with a conventional VHS cassette. The video camera combined with a VCR 1 has a camera unit 2 and a VCR unit 3 integrated in a single unit. The camera unit 2 is provided in front of the VCR unit 3, or toward an object to shoot. The VCR unit 3 has a handle 21 provided on a top thereof for use in carrying the video camera combined with VCR 1. The camera unit 2 has an electronic viewfinder 5 at a predetermined height on a top thereof. An image of an object picked up by the camera unit 2 is converted to video signal and image processed. The image processed signal is displayed on a cathode-ray tube or a liquid crystal display panel in the viewfinder 5. This allows an operator to see the imaged object.

The camera unit 2 has a grip 6 provided on one side of the camera unit 2. The grip 6 has a curved surface that fits the operator's hand. While imaging, the operator should put the video camera combined with a VCR 1 on his or her shoulder and holds the viewfinder 5 by hand to hold it stably.

The grip 6 is covered with a grip belt 22. One end of the grip belt 22 is fixed, and the other is folded through a ring and can be stuck to a center portion of the grip belt 22 with stickable and peelable tape, such as the Magic Tape (trade name). The grip belt 22 used in the embodiment is formed of flexible belt member (having the operator's hand back fitted thereto) and comparably rigid member which are stuck together. If the operator holds the grip 6 by his or her right hand, the grip belt 22 urges the right hand to hold the grip 6 securely.

The grip 6 has two zoom buttons 23 provided thereon. The operator can perform a zooming-in or -out operation to change the perspective by alternately pressing the zoom buttons 23 with any two of his or her right first, second, and third fingers. The grip 6 also has a start/stop button 24 provided on a rear side thereof. The start/stop button 24 can alternately select either of two modes of operation, imaging start and waiting, by pressing it with his or her right thumb.

The camera unit 2 has a microphone 7 provided on a front side thereof. The microphone 7 can receive external sounds.

The VCR unit 3, as shown in FIG. 2, has a cassette lid 25 provided on a center portion of one side thereof to allow loading or unloading of a tape cassette 8. The tape cassette 8, which will be described in detail, can be loaded in position in the VCR unit 3 through a cassette holder (not shown). After this, magnetic tape 12 wound in the tape cassette 8 can have a video signal, an audio signal, and control signals recorded thereon or reproduced therefrom.

Also, the VCR unit 3 has a shoulder mounting portion 26 formed on a rear bottom side thereof. The operator should place it on his or her shoulder to hold the VCR unit 3 securely while imaging.

Figure 3:
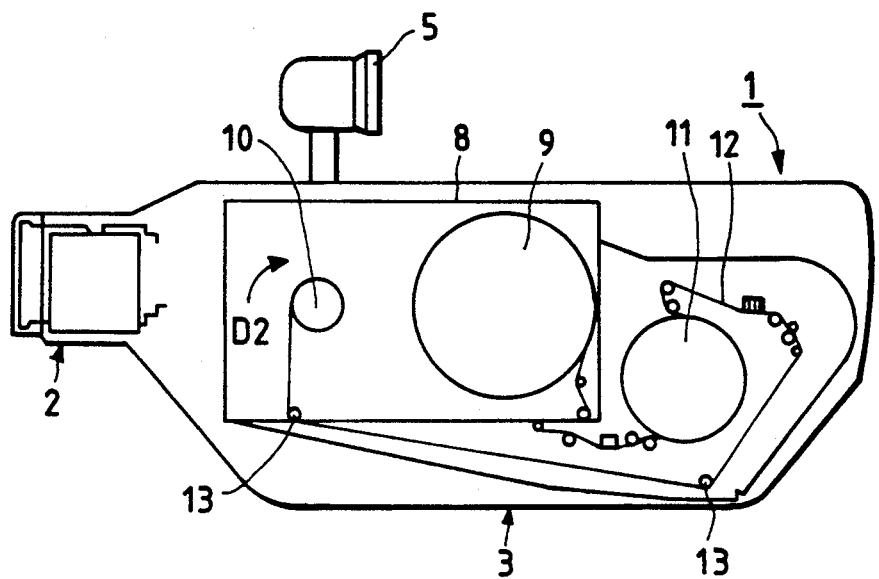
FIG. 3 is a cross sectional side view of an outline of the magnetic tape travel system in the VCR unit of the video camera combined with a VCR shown in FIG. 1.
Figure 4:
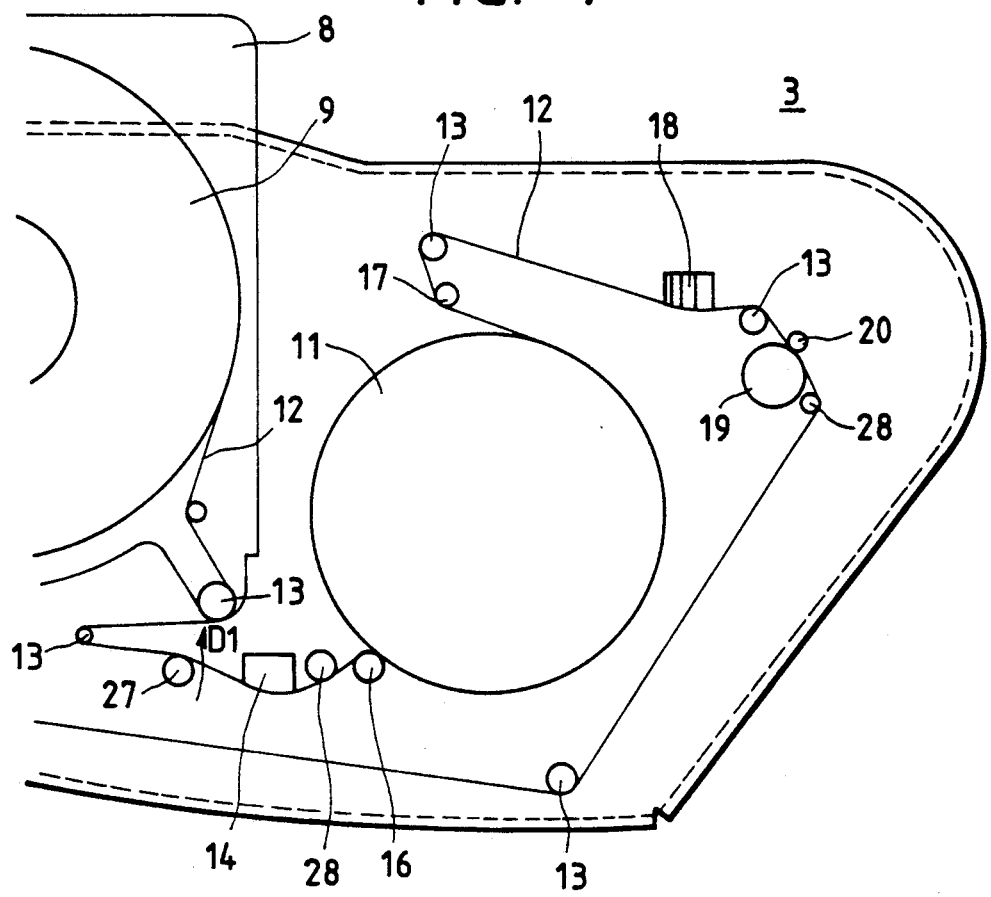
FIG. 4 is a cross section side view of major portions around a cylinder assembly in FIG. 3.

In turn, referring to FIGS. 3 and 4, the following describes the VCR unit 3, particularly a magnetic tape travel system therein in the first embodiment. FIG. 3 is a cross sectional side elevation of an outline of the magnetic tape travel system in the VCR unit 3. FIG. 4 is a cross section side elevation of major portions around a cylinder assembly in FIG. 3.

As shown in the figures, a magnetic tape 12 in the tape cassette 8 loaded in position in the VCR unit 3 is pulled out of a cassette reel hub engaged with a supply reel base 9. It then is changed about 180 degrees by rotatable rollers 13. It then is fitted to tension pin 27. The tension pin 27 is forced in a D1 direction by a spring and is moved as interlocked with rotation moment of the supply reel base 9. That is, if the rotation moment of the supply reel base 9 becomes less, or if the magnetic tape 12 is loose as put out of the supply reel base 9, then the tension pin 27 is moved in the D1 direction by spring force and at the same time, the supply reel base 9 has higher load given thereto. Conversely, if the magnetic tape 12 is tense as put out, the tension pin 27 is tense with the magnetic tape 12. The tension pin 27 is not spring forced, not increasing the load on the supply reel base 9. Thus, the magnetic tape 12 can be supplied from the supply reel base 9 at a constant tension even when its diameter on the supply reel base 9 changes.

The magnetic tape 12 having passed by the tension pin 27 passes on a full-width erasing head 14. The full-width erasing head 14 can erase all the recorded contents of the magnetic tape 12 when new information is recorded onto it. The magnetic tape 12, then, passes a fixed pin 28, is changed in its direction by a guide roller 16, and is wound about 190 degrees on a cylinder assembly 11.

The cylinder assembly 11 is chiefly made up of two members, a lower member, i.e. a fixed cylinder, and an upper member, i.e. a rotatable cylinder. The fixed cylinder is fixed on a mechanical chassis. Its upper edge has a tape guide portion. The rotatable cylinder, on the other hand, is revolved at as high as 1,800 rpm. It has at least two magnetic video heads mounted on parts thereof. The video heads can convert the video signal to magnetic signal. It should be noted that as the magnetic tape 12 is obliquely wound on the cylinder assembly 11, magnetic recording is obliquely made on the magnetic tape 12 by the cylinder assembly 11. This is a feature of a so-called helical scanning method which increases recording density.

After the magnetic tape 12 is wound about 190 degrees on the cylinder assembly 11 as described above, it is changed in its direction by a guide roller 17, and passes another rotatable roller 13 to an audio head 18. The audio head 18 can convert the audio signal to magnetic signal for recording on or reproduction from it. At the same time, it also can record or reproduce the control signal for traveling of magnetic tape 12.

The control operation is made as follows. A tape traveling distance X from an exit of the cylinder assembly 11 to a control head on a part of the audio head 18 is predetermined 79.244 mm. The distance X is controlled to be always kept to the length. This control of distance X must be made in the usual VCRs of VHS type.

The magnetic tape 12 having passed the audio head 18 passes still another rotatable roller 13, and is pressed between a pinch roller 19 and a capstan 20 to move toward a take-up reel base 10. The magnetic tape 12 then is changed about 180 degrees in its direction by another fixed pin 28 and rotatable roller 13, passes still another rotatable roller 13 inside the tape cassette 8, and enters another cassette reel hub engaged with the take-up reel base 10. The take-up reel base 10 winds the magnetic tape 12 pulled out of the pinch roller 19 and the capstan 20 in a D2 direction.

The traveling path described above for the magnetic tape 12 is complicated as the cylinder assembly 11 is positioned differently from those of the conventional VCRs to a great extent. However, the magnetic tape 12 can be compatibly used in the conventional VCRs as the basic arrangement of the embodiment is made to meet the specifications of the VCRs of VHS type.

Figure 8:
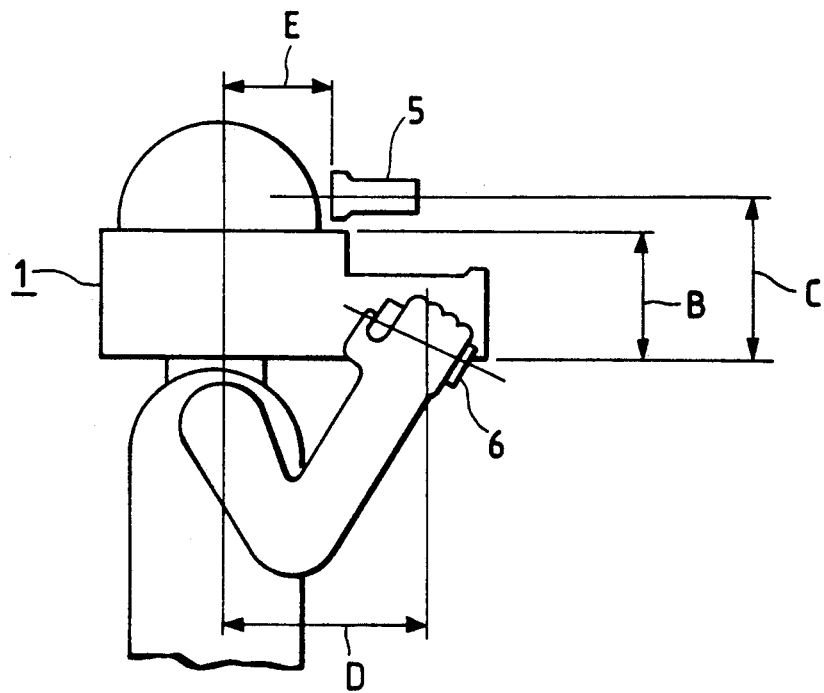
FIG. 8 is a side view for the video camera combined with a VCR and the operator of FIG. 7 viewing from arrow X.
Figure 9:
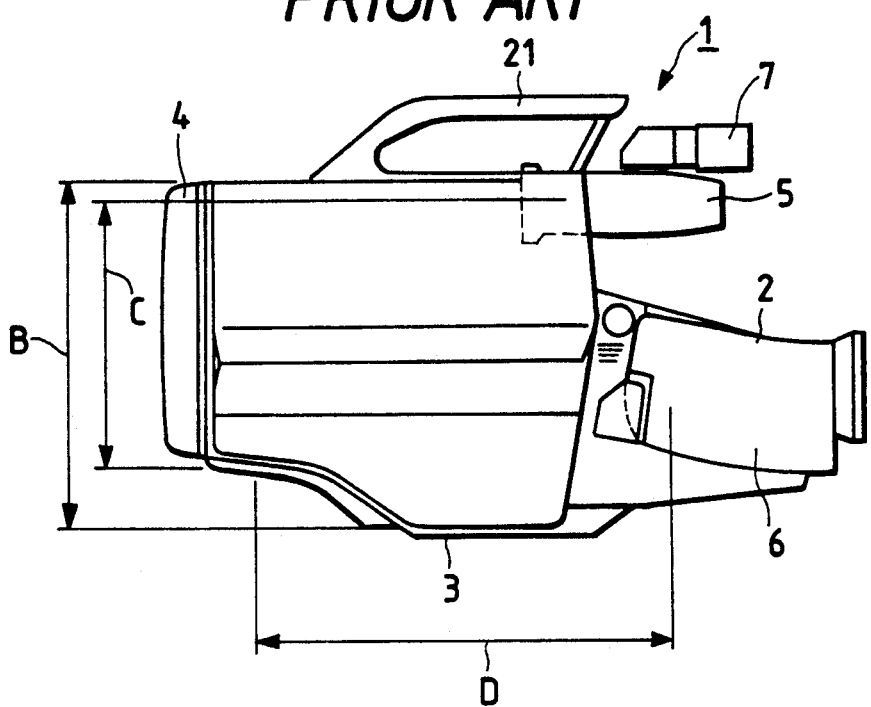
FIG. 9 is a side view for a model of the conventional video cameras combined with a VCR.
Figure 10:
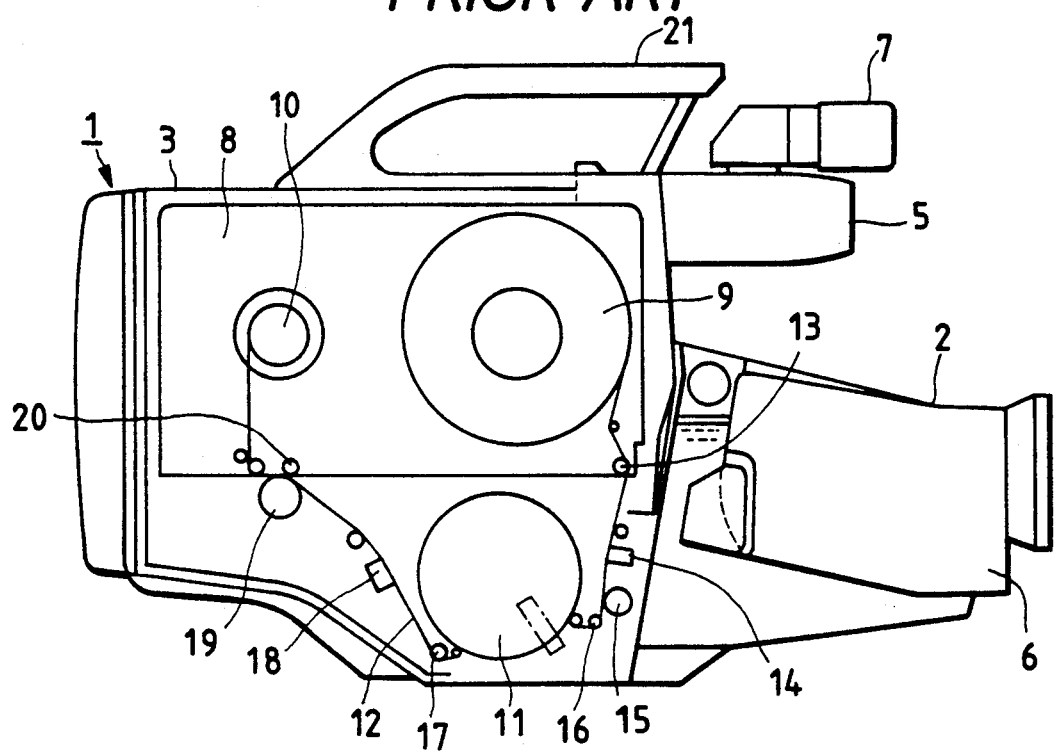
FIG. 10 is a sectional side view illustrating the inside of the VCR unit of the video camera combined with a VCR shown in FIG. 9.

In the video camera combined with a VCR 1 in the first embodiment described above, the cylinder assembly 11 is positioned along a longitudinal direction of the tape cassette 8 loaded. The VCR unit 3 therefore can be shaped rectangle. The camera unit 2, as described above, is provided in the front of the VCR unit 3. These features provide the video camera combined with a VCR 1 a length from the grip to the shoulder sufficient for placement on the shoulder, and also renders the height of the video camera combined with VCR 1 shorter. This shape is ideal in view of human technology when the apparatus is placed on the shoulder. In the first embodiment, dimensions of the video camera combined with VCR 1 meet the conditions, $D \approx 2C$ and $B < C$, given in reference to FIGS. 8 and 9., and a plane distance from a center of the shoulder mounting portion 26 and that of the grip 6 is made 250 mm or more.

Also, in the first embodiment, a bottom of a casing covering the cylinder assembly 11 serves as the shoulder mounting portion 26. This allows the cylinder assembly 11 to be put on the shoulder stably while imaging. The video camera combined with a VCR 1 will be well balanced in weight and receive little adverse effects such as vibrations and impacts.

In the video camera combined with a VCR 1 in the first embodiment, the major rotatable members of the VCR unit 3, such as the cylinders and reel bases, are axially positioned so an axis of rotation of each of the members is perpendicular to the sides of the VCR unit 3.

Figure 5:
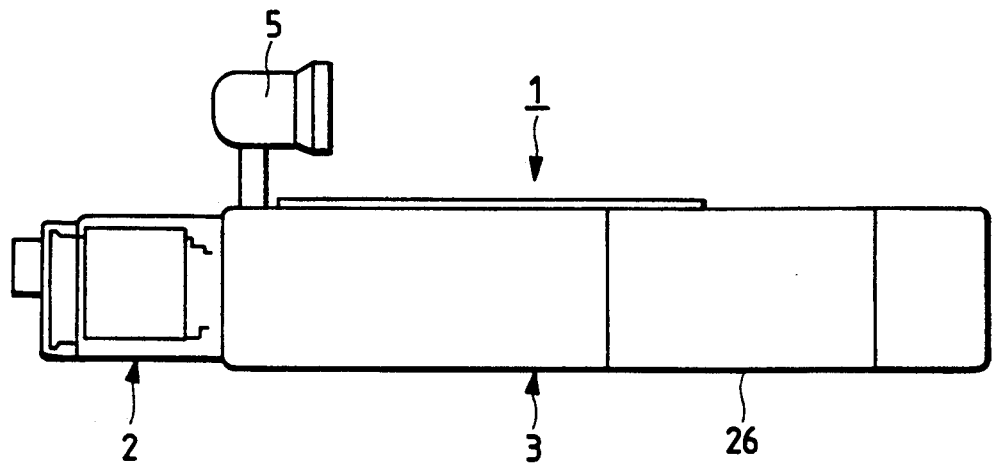
FIG. 5 is a side view of a video camera combined with a VCR according to a second embodiment of the present invention.
Figure 6:
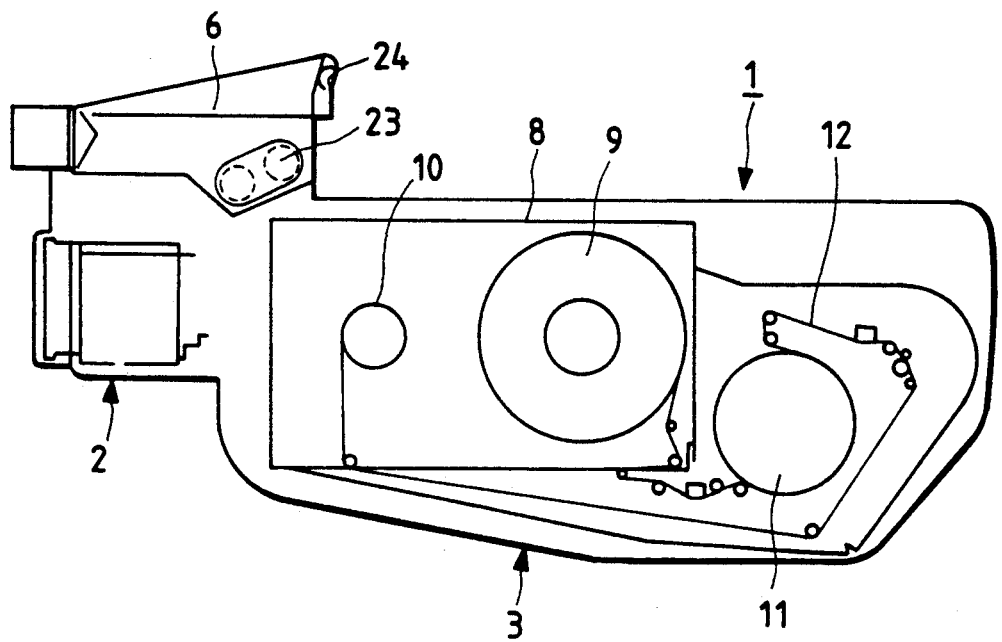
FIG. 6 is an internal view of the video camera combined with a VCR of FIG. 5 viewing a top thereof.
Figure 7:
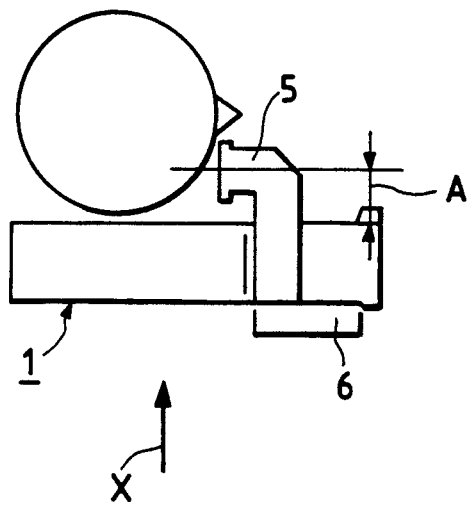
FIG. 7 is a plan view for a video camera combined with a VCR with an operator using it.

In turn, a second illustrative invention of the present invention for a video camera combined with a VCR, as shown in FIGS. 5 and 6, has the major rotatable members of a VCR unit 3, such as a cylinders and reel bases, are axially positioned so an axis of rotation of each of the members in parallel to the sides of the VCR unit 3. In other words, the height of the overall video camera combined with VCR can be minimized. FIG. 5 is a side view of the video camera combined with a VCR in the second embodiment. FIG. 6 is a horizontal sectional view of the video camera combined with a VCR shown in FIG. 5 viewing a top thereof. The video camera combined with a VCR 1, as shown in FIG. 6, has a viewfinder 5 on a top thereof. A camera unit 2 has a grip 6 on a side thereof. The grip 6 has a zoom button 23 on a top thereof. The grip 6 also has a start/stop button 24 on a rear side thereof. The VCR unit 3 has a shoulder mounting portion 26 on a casing covering a cylinder assembly 11 on a bottom thereof. The video camera combined with a VCR constructed as such in the second embodiment provides effects similar to those of the first embodiment.

Figure 11:
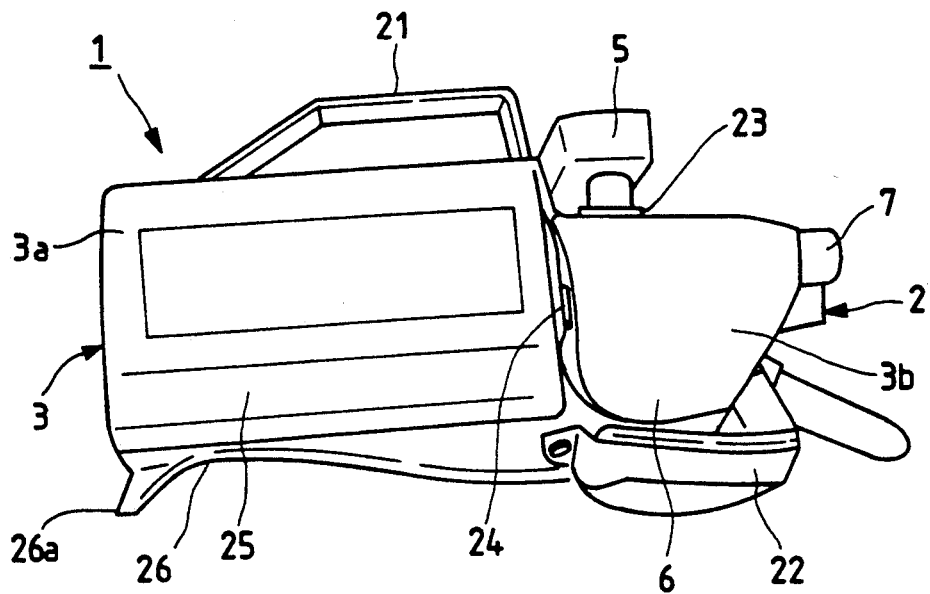
FIG. 11 is an external perspective view of a video camera combined with a VCR according to a third embodiment of the present invention viewing a side thereof.
Figure 12:
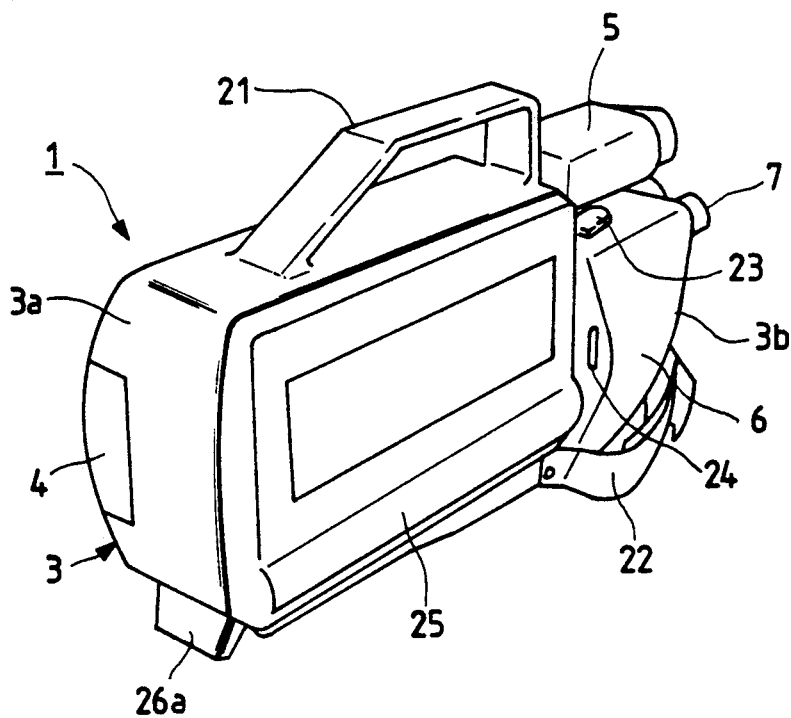
FIG. 12 is another external perspective view for the video camera combined with a VCR of FIG. 11 as viewed from a top left side thereof.
Figure 13:
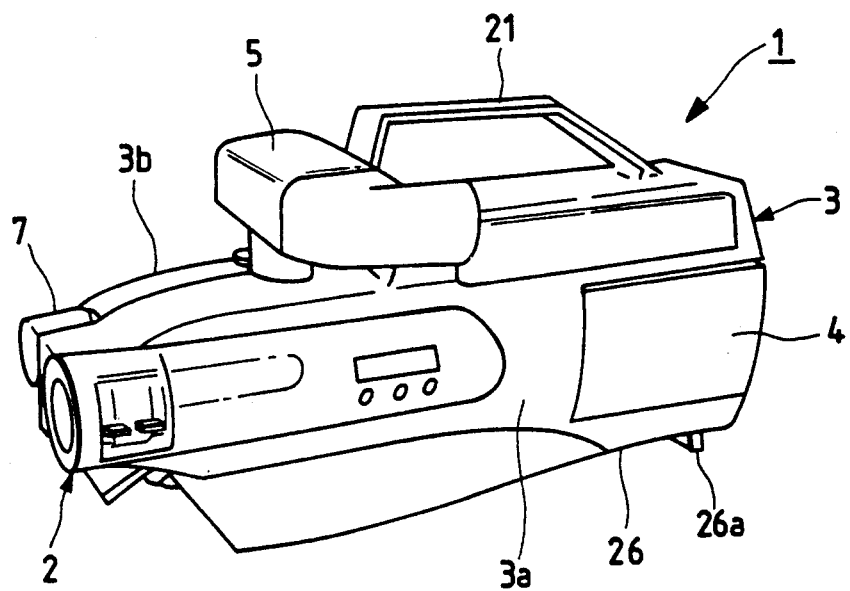
FIG. 13 is still another external perspective view for the video camera combined with a VCR of FIG. 11 viewing the other side thereof, or toward the rear side in FIG. 11.

FIG. 11 is an external perspective view of a third illustrative embodiment of the present invention for a video camera combined with a VCR viewing a side thereof. FIG. 12 is another external perspective view of the video camera combined with VCR shown in FIG. 11 viewing a top left side thereof. FIG. 13 is still another external perspective view for the video camera combined with VCR shown in FIG. 11 viewing the other side thereof, or viewing the rear side in FIG. 11.

In FIGS. 11 through 13 is shown a video camera combined with a VCR 1 for use with a conventional VHS cassette. The video camera combined with a VCR 1 has a camera unit 2 and a VCR unit 3 integrated in a single unit. The VCR unit 3 comprises a VCR main body 3a having reel bases capable of loading a tape cassette thereon and a VCR front end 3b having a cylinder assembly provided therein. The VCR front end 3b is provided in front of the VCR main body 3a, that is toward an object to shoot. The camera unit 2 is provided in parallel with the VCR front end 3b in front of the VCR main body 3a, or also toward the object. Thus, 1. the front end 3b is next to the camera unit 2 with respect to the object, and 2. the front end 3b and the camera unit 2 are between the main body 3a and the object during imaging. The VCR unit 3 has a handle 21 provided on a top thereof for use in carrying the video camera combined with VCR 1. The camera unit 2 has an electronic viewfinder 5 at a predetermined height on a top thereof. An image of object picked up by the camera unit 2 is converted to video signal and image processed. The image processed signal is displayed on a cathode-ray tube or a liquid crystal display panel in the viewfinder 5. This allows an operator to see the imaged object.

The VCR unit 3 has a grip 6 provided on one side of the VCR front end 3b of the VCR unit 3. The grip 6 has a curved surface that fits the operator's hand. While imaging, the operator should place the video camera combined with VCR 1 on his or her shoulder and hold the viewfinder 5 by hand to hold it stably.

The grip 6 is covered with a grip belt 22. One end of the grip belt 22 is fixed, and the other is folded through a ring and can be stuck to a center portion of the grip belt 22 with stickable and peelable tape, such as the Magic Tape. The grip belt 22 used in the embodiment is formed of flexible belt member (having the operator's hand back fitted thereto) and comparably rigid member which are struck together. If the operator holds the grip 6 by his or her right hand, the grip belt 22 urges the right hand to hold the grip 6 securely.

The grip 6 has two zoom buttons 23 provided thereon. The operator can perform a zooming-in or -out operation to change the perspective by alternately pressing the zoom buttons 23 with any two of his or her right first, second, and third fingers. The grip 6 also has a start/stop button 24 provided on a rear side thereof. The start/stop button 24 can alternately select either of two modes of operation, imaging start and waiting, by pressing it with his or her right thumb.

The camera unit 2 has a microphone 7 provided adjacent thereto. The microphone 7 can receive external sounds.

The VCR main body 3a of the VCR unit 3, as shown in FIGS. 11 and 12, has a cassette lid 25 provided on a center portion of one side thereof to allow loading or unloading of a tape cassette 8. The tape cassette 8, which will be described in detail, can be loaded in position in the VCR unit 3 through a cassette holder (not shown). After this, a magnetic tape 12 wound in the tape cassette 8 can have a video signal, an audio signal, and control signals recorded thereon or reproduced therefrom.

Also, the VCR main body 3a of the VCR unit 3 has a shoulder mounting portion 26 formed on a rear bottom side thereof in a curved shape fitting an operator's shoulder. The operator should put it on his or her shoulder to hold the VCR unit 3 securely in imaging. A rear end 26a of the shoulder mounting portion 26 functions as a leg to hold the video camera combined with VCR 1 horizontally and stably when it is not in use.

The VCR unit 3, as shown in FIG. 13, has a battery 4 provided on a rear side thereof.

Figure 14:
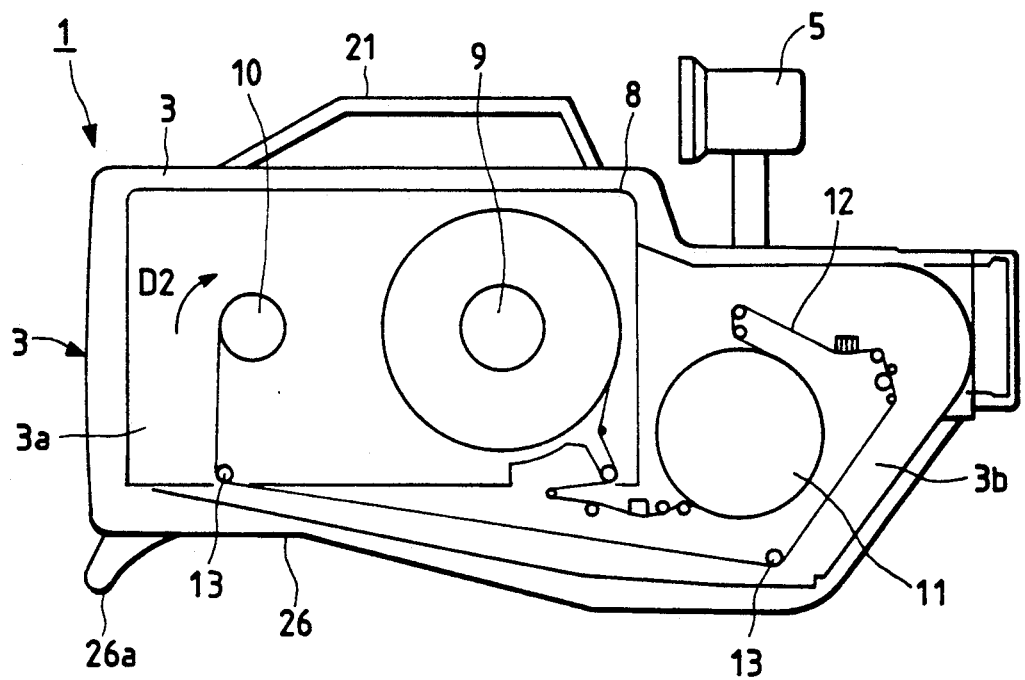
FIG. 14 is a cross sectional side view of the magnetic tape travel system in the VCR unit of the video camera combined with a VCR shown in FIG. 11.
Figure 15:
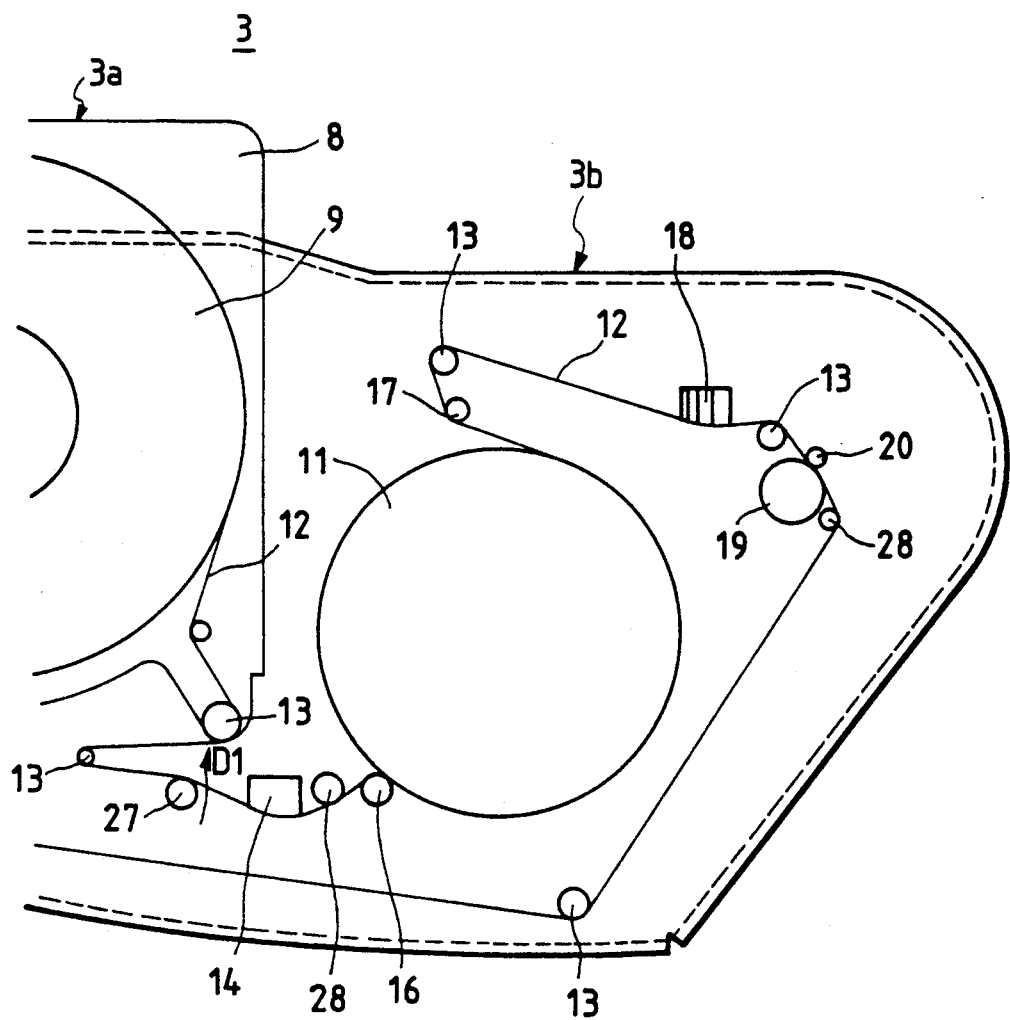
FIG. 15 is a cross section side view of major portions around a cylinder assembly in FIG. 14.

In turn, referring to FIGS. 14 and 15, the following describes the VCR unit 3, particularly a magnetic tape travel system therein in the third embodiment. FIG. 14 is a cross sectional side elevation of the magnetic tape travel system in the VCR unit 3. FIG. 15 is a cross section side elevation of major portions around a cylinder assembly in FIG. 14.

As shown in the figures, a magnetic tape 12 in the tape cassette 8 loaded in position in the VCR unit 3 is pulled out of a cassette reel hub engaged with a supply reel base 9. It then is changed about 180 degrees by rotatable rollers 13. It then is fitted to tension pin 27. The tension pin 27 is forced in a D1 direction by a spring and is moved as interlocked with rotation moment of the supply reel base 9. That is, if the rotation moment of the supply reel base 9 becomes less, or if the magnetic tape 12 is loose as put out of the supply reel base 9, then the tension pin 27 is moved in the D1 direction by spring force and at the same time, the supply reel base 9 has higher load given thereto. Conversely, if the magnetic tape 12 is tense as put out, the tension pin 27 is in tense with the magnetic tape 12. The tension pin 27 is not spring forced, not increasing the load on the supply reel base 9. Thus, the magnetic tape 12 can be supplied from the supply reel base 9 at a constant tension even when its diameter on the supply reel base 9 changes.

The magnetic tape 12 having passed by the tension pin 27 passes on a full-width erasing head 14. The full-width erasing head 14 can erase all the recorded contents of the magnetic tape 12 when new information is recorded onto it. The magnetic tape 12, then, passes a fixed pin 28, is changed in its direction by a guide roller 16, and is wound about 190 degrees on a cylinder assembly 11.

The cylinder assembly 11 is chiefly made up of two members, a lower member, i.e. a fixed cylinder, and an upper member, i.e. a rotatable cylinder. The fixed cylinder is fixed on a mechanical chassis. Its upper edge has a tape guide portion. The rotatable cylinder, on the other hand, is revolved at as high as 1,800 rpm. It has at least two magnetic video heads mounted on parts thereof. The video heads can convert the video signal to magnetic signal. It should be noted that as the magnetic tape 12 is obliquely wound on the cylinder assembly 11, magnetic recording is obliquely made on the magnetic tape 12 by the cylinder assembly 11. This is a feature of a so-called helical scanning method which increases recording density.

After the magnetic tape 12 is wound about 190 degrees on the cylinder assembly 11 as described above, it is changed in its direction by a guide roller 17, and passes another rotatable roller 13 to an audio head 18. The audio head 18 can convert the audio signal to magnetic signal for recording on or reproduction from it. At the same time, it also can record or reproduce the control signal for traveling of magnetic tape 12.

The control operation is made as follows. A tape traveling distance X from an exit of the cylinder assembly 11 to a control head on a part of the audio head 18 is predetermined 79.244 mm. The distance X is controlled to be always kept to the length. This control of distance X must be made in the usual VCRs of VHS type.

The magnetic tape 12 having passed the audio head 18 passes still another rotatable roller 13, and is pressed between a pinch roller 19 and a capstan 20 to move toward a take-up reel base 10. The magnetic tape 12 then is changed about 180 degrees in its direction by another fixed pin 28 and rotatable roller 13, passes still another rotatable roller 13 inside the tape cassette 8, and enters another cassette reel hub engaged with the take-up reel base 10. The take-up reel base 10 winds the magnetic tape 12 pulled out of the pinch roller 19 and the capstan 20 in a D2 direction.

The traveling path described above for the magnetic tape 12 is complicated as the cylinder assembly 11 is positioned differently from those of the conventional VCRs to a great extent. However, the magnetic tape 12 can be compatibly used in the conventional VCRs as basic arrangement of the embodiment is made so as to meet the specifications of the VCRs of VHS type.

In the video camera combined with VCR 1 in the third embodiment described above, the cylinder assembly 11 is positioned in a longitudinal direction of the tape cassette 8 loaded. The VCR unit 3 therefore can be shaped rectangle. In other words, as the depth is made longer. This can give the video camera combined with VCR 1 a length from the grip to the shoulder sufficient to place it on the shoulder, and also can make the height of the video camera combined with VCR 1 shorter. This shape is ideal in view of human technology when it is put on the shoulder. In the third embodiment, dimensions of the video camera combined with VCR 1 meet the conditions, $D \approx 2C$ and $B < C$, given in reference to FIGS. 8 and 9., and a plane distance from a center of the shoulder pad 26 and that of the grip 6 is made 250 mm or more.

Also, in the third embodiment, a bottom of a casing covering the cylinder assembly 11 in the VCR front end 3b serves as the shoulder mounting portion 26. This allows the cylinder assembly 11 to be put on the shoulder stably upon imaging. The video camera combined with VCR 1 will be well balanced in weight and receive little adverse effects such as vibrations and impacts.

In the video camera combined with a VCR 1 in the third embodiment, the major rotatable members of the VCR unit 3, such as the cylinders and reel bases, are axially positioned so an axis of rotation of the members is perpendicular to the sides of the VCR unit 3.

Figure 16:
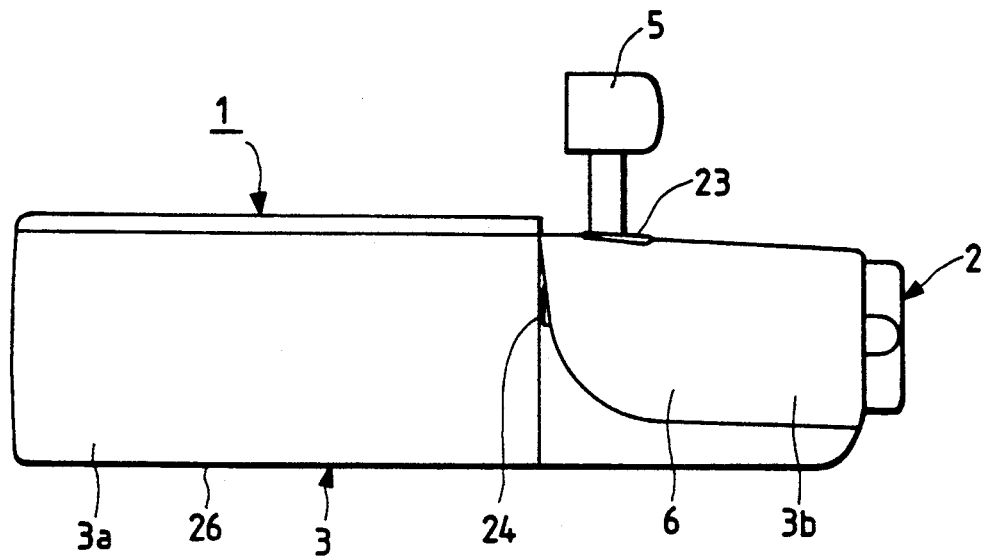
FIG. 16 is a side view of a video camera combined with a VCR according to a fourth embodiment of the present invention.
Figure 17:
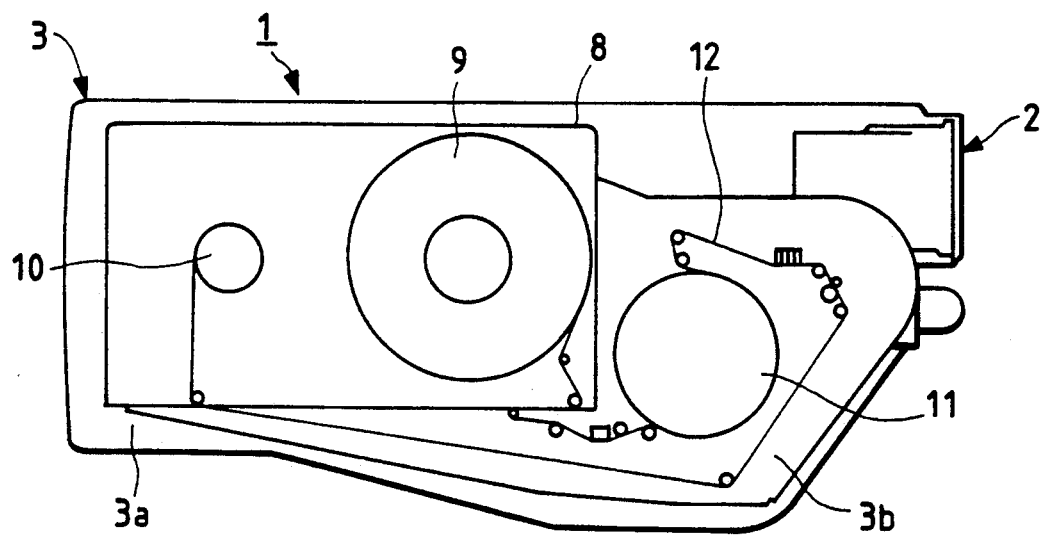
FIG. 17 is an internal view of the video camera combined with a VCR of FIG. 16 as looked toward a top thereof.

In turn, a fourth illustrative invention of the present invention for a video camera combined with a VCR, as shown in FIGS. 16 and 17, has the major rotatable members of a VCR unit 3, such as a cylinders and reel bases, are axially positioned so an axis of rotation of each of the members is parallel to the sides of the VCR unit 3. In other words, the height of the overall video camera combined with VCR can be minimized. FIG. 16 is a side view of the video camera combined with VCR in the fourth embodiment. FIG. 17 is a horizontal sectional view of the video camera combined with VCR shown in FIG. 16 as looked toward a top thereof. The video camera combined with VCR 1, as shown in FIG. 17, has a viewfinder 5 on a top thereof. A VCR front end 3b of the VCR unit 3 has a grip 6 on a side thereof. The grip 6 has a zoom button 23 on a top thereof. The grip 6 also has a start/stop button 24 on a rear side thereof. The VCR unit 3 has a shoulder mounting portion 26 on a rear bottom thereof. The video camera combined with a VCR constructed as such in the fourth embodiment provides effects similar to those of the third embodiment.

As many apparently widely different embodiments of the present invention may be made without departing from the spirit and scope thereof, it is to be understood that the present invention is not limited to the specific embodiments thereof except as defined in the appended claims.

We claim:

1. A video camera combined with a VCR comprising:
   a camera unit for imaging an object and producing a video signal representing an image of the object; and
   a video signal recording unit including a supply reel base, a take-up reel base, and a cylinder assembly made up of a fixed cylinder and a rotatable cylinder having a magnetic head built therein for recording said video signal on a magnetic tape housed in a tape cassette, the video signal recording unit being connected to the camera unit such that the camera unit is disposed between the video signal recording unit and the object during the imaging, and said magnetic tape being wound around reel hubs in said tape cassette respectively engaged with said supply and take-up reel bases and being supplied from a first of the reel hubs to said cylinder assembly and taken up by a second of the reel hubs through said cylinder assembly;
   wherein said cylinder assembly is positioned in a direction longitudinally outward of the first of the reel hubs with respect to the second of the reel hubs of the tape cassette loaded in said video signal recording unit.

2. The video camera combined with a VCR according to claim 1 wherein a bottom side of a casing covering said cylinder assembly is formed as a shoulder mounting portion.

3. The video camera combined with a VCR according to claim 1 wherein a casing covering said camera unit has a grip formed thereon.

4. The video camera combined with a VCR according to claim 2 wherein a casing covering said camera unit has a grip formed thereon.

5. The video camera combined with a VCR according to claim 4 wherein said shoulder mounting portion and said grip are formed so that a distance from a center of said shoulder mounting portion to that of said grip is equal to or longer than 250 mm.

6. A video camera combined with a VCR comprising:
   a camera unit for imaging an object and producing a video signal representing an image of the object; and
   a video signal recording unit including a first portion having a supply reel base, and a take-up reel base and a second portion having a cylinder assembly made up of a fixed cylinder and a rotatable cylinder having a magnetic head built therein for recording said video signal on a magnetic tape housed in a tape cassette, the video signal recording unit being connected to the camera unit such that the camera unit is disposed next to the second portion with respect to the object during the imaging, both the camera unit and the second portion being disposed between the first portion and the object during the imaging, and said magnetic tape being wound around reel hubs in said tape cassette respectively engaged with said supply and take-up reel bases and being supplied from a first of the reel hubs to said cylinder assembly and taken up by a second of the reel hubs through said cylinder assembly;

wherein said cylinder assembly is positioned in a direction longitudinally outward of the first of the reel hubs with respect to the second of the reel hubs of the tape cassette loaded in said video signal recording unit.

7. The video camera combined with a VCR according to claim 6 wherein a casing covering said camera unit has a grip formed thereon.

8. The video camera combined with a VCR according to claim 6 wherein a bottom side of a casing covering said first section of said video signal recording unit is formed as a shoulder mounting portion.

9. The video camera combined with a VCR according to claim 7 wherein a bottom side of a casing covering said first section of said video signal recording unit is formed as a shoulder mounting portion.

10. The video camera combined with a VCR according to claim 9 wherein said shoulder mounting portion and said grip are formed so that a distance from a center of said shoulder mounting portion to that of said grip is equal to or longer than 250 mm.

* * * * *